(12) United States Patent
Gulati et al.

(10) Patent No.: US 9,280,471 B2
(45) Date of Patent: Mar. 8, 2016

(54) MECHANISM FOR SHARING PRIVATE CACHES IN A SOC

(71) Applicant: Apple Inc., Cupertino, CA (US)

(72) Inventors: Manu Gulati, Saratoga, CA (US); Harshavardhan Kaushikkar, San Jose, CA (US); Gurjeet S. Saund, Saratoga, CA (US); Wei-Han Lien, San Jose, CA (US); Gerard R. Williams, III, Los Altos, CA (US); Sukalpa Biswas, Fremont, CA (US); Brian P. Lilly, San Francisco, CA (US); Shinye Shiu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 279 days.

(21) Appl. No.: 14/081,549

(22) Filed: Nov. 15, 2013

(65) Prior Publication Data

US 2015/0143044 A1    May 21, 2015

(51) Int. Cl.
*G06F 12/00* (2006.01)
*G06F 12/08* (2006.01)

(52) U.S. Cl.
CPC .......... *G06F 12/084* (2013.01); *G06F 12/0802* (2013.01); *G06F 12/0806* (2013.01); *G06F 12/0811* (2013.01); *G06F 12/0815* (2013.01); *G06F 12/0817* (2013.01)

(58) Field of Classification Search
CPC ............ G06F 12/0802; G06F 12/0806; G06F 12/0811; G06F 12/0815; G06F 12/0817; G06F 12/084
See application file for complete search history.

(56) References Cited

U.S. PATENT DOCUMENTS

| 8,103,894 | B2 | 1/2012 | Balakrishnan et al. |
| 8,145,848 | B2 | 3/2012 | Jain et al. |
| 2011/0276760 | A1 | 11/2011 | Chou |
| 2013/0173860 | A1 | 7/2013 | Comparan et al. |
| 2014/0115268 | A1* | 4/2014 | Beers ................. G06F 12/0828 711/146 |
| 2014/0129773 | A1* | 5/2014 | Habermann ........ G06F 12/0811 711/122 |
| 2014/0310472 | A1* | 10/2014 | Hollaway, Jr. ...... G06F 12/0811 711/128 |

* cited by examiner

*Primary Examiner* — Shawn X Gu
(74) *Attorney, Agent, or Firm* — Rory D. Rankin; Meyertons, Hood, Kivlin, Kowert & Goetzel, P.C.

(57) ABSTRACT

Systems, processors, and methods for sharing an agent's private cache with other agents within a SoC. Many agents in the SoC have a private cache in addition to the shared caches and memory of the SoC. If an agent's processor is shut down or operating at less than full capacity, the agent's private cache can be shared with other agents. When a requesting agent generates a memory request and the memory request misses in the memory cache, the memory cache can allocate the memory request in a separate agent's cache rather than allocating the memory request in the memory cache.

20 Claims, 7 Drawing Sheets

MECHANISM FOR SHARING PRIVATE CACHES IN A SOC

BACKGROUND

1. Field of the Invention

The present invention relates generally to processing memory requests in a SoC, and in particular to methods and mechanisms for sharing an agent's private cache in a SoC.

2. Description of the Related Art

Integrated circuits (ICs) and Systems on Chips (SoCs) often include multiple circuits or agents that have a need to communicate with each other and/or access data stored in memory. These agents may include one or more of a central processing unit (CPU), graphics processing unit (GPU), input/output (I/O) processor, and/or other devices. Each agent may have a private cache in addition to the shared caches and shared memory in the SoC.

Techniques for reducing the power consumption of a SoC are increasingly desired. One of the techniques used to reduce power is by power-gating or shutting down unused or underutilized circuitry. When an agent is powered down, its cache memory is often powered down accordingly. However, this may be a waste of resources while other agents are actively seeking more memory capacity or bandwidth.

SUMMARY

Systems, apparatuses, processors, and methods for sharing the private cache of an agent within a SoC are disclosed.

In one embodiment, a SoC may also include a coherence point, bus fabric, and a memory controller including a memory cache. The processor complex may include one or more processor cores, a level one (L1) cache for each processor core, and a shared L2 cache. The coherence point may include a L2 duplicate tags structure with duplicate tags from the L2 cache of the processor complex. The SoC may also include various other agents, and many of the agents may have one or more processor cores and one or more levels of a private cache.

In one embodiment, when one or more conditions are detected for a given agent, the private cache of the agent may be shared with other agents. In one embodiment, a first condition may exist when a given agent is power-gated or shut-down. In other embodiments, the detection of other conditions may be used to trigger the sharing of the given agent's cache with other agents.

In one embodiment, a first agent may generate a non-coherent memory request. The non-coherent memory request may be a read request or a write request. The first agent may send the non-coherent memory request to the coherence point. If the non-coherent memory misses in the L2 duplicate tags of the coherence point, the non-coherent memory request may be sent to the memory cache. If the non-coherent memory request misses in the memory cache, then control logic may determine if any of the conditions have been triggered for any of the other agents' private caches. If any of the various conditions have been triggered to enable sharing, then the non-coherent memory request may be allocated in a second agent's private cache.

In one embodiment, an allocate command may be sent to the coherence point and the second agent's private cache. In response to receiving the allocate command, the coherence point may generate a new entry for the non-coherent memory request in a coherent transaction table. For a read request, when the data corresponding to the request is returned from memory, then the data may be sent to the coherence point. The new entry in the coherent transaction table may be retired in response to receiving this data, and then the data may be sent to the second agent's private cache from the coherence point. When the condition(s) which triggered sharing of the second agent's private cache are no longer present, then the data from other agents may be evicted from the second agent's private cache to memory via the coherence point and memory controller.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a coherence point . . . ." Such a claim does not foreclose the system from including additional components (e.g., a processor complex, a memory).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, the terms "first" and "second" memory requests can be used to refer to any two memory requests.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
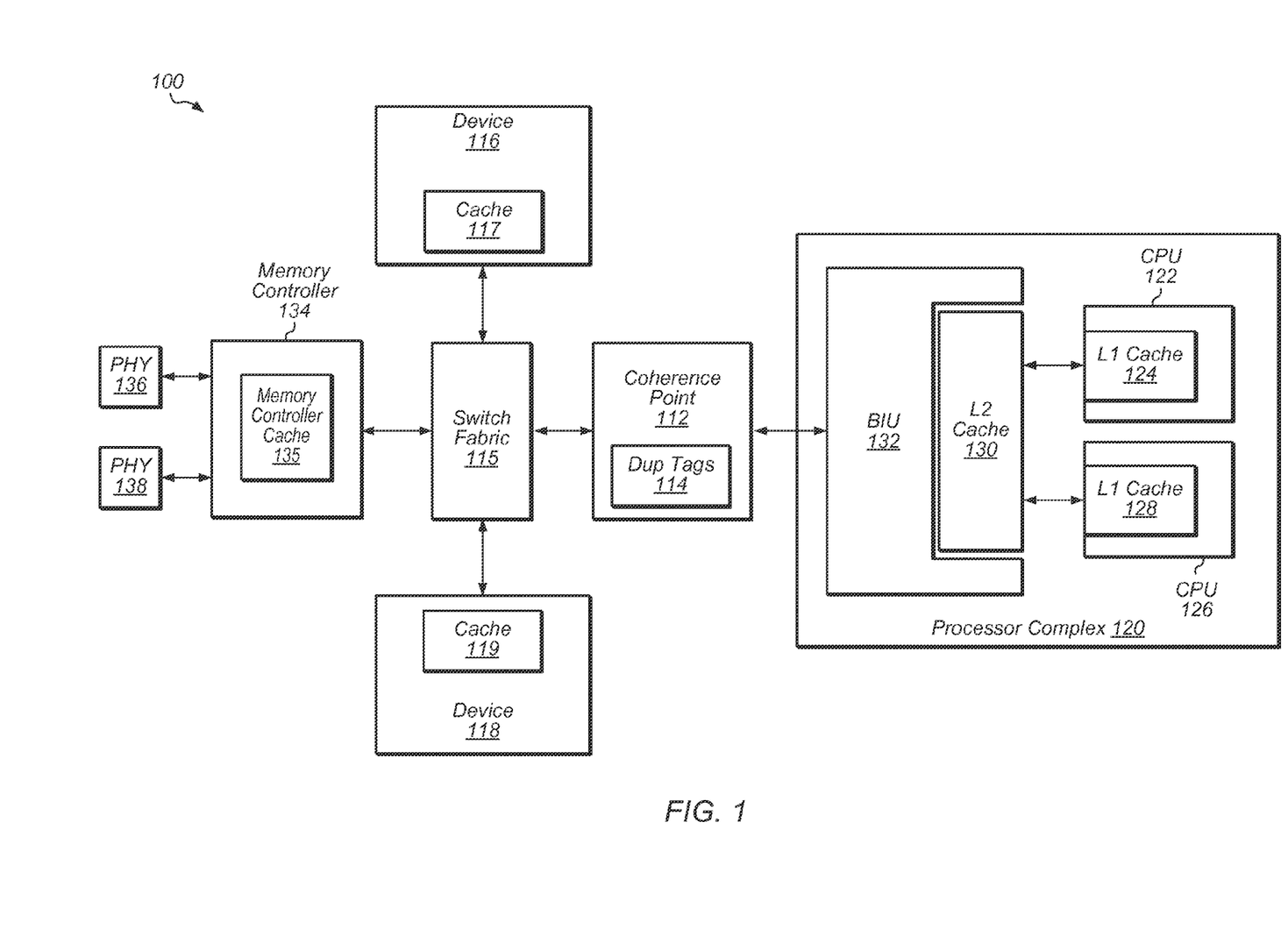
FIG. 1 is a block diagram that illustrates one embodiment of a portion of an integrated circuit.

Referring now to FIG. 1, a block diagram illustrating one embodiment of a portion of an integrated circuit (IC) is shown. In the illustrated embodiment, IC 100 includes processor complex 120, coherence point 112, switch fabric 115, devices 116 and 118, memory controller 134, and memory physical interface circuits (PHYs) 136 and 138. It is noted that IC 100 may also include many other components not shown in FIG. 1. In various embodiments, IC 100 may also be referred to as a system on chip (SoC), an application specific integrated circuit (ASIC), or an apparatus.

Processor complex 120 may include central processing units (CPUs) 122 and 126, level two (L2) cache 130, and bus interface unit (BIU) 132. In other embodiments, processor complex 120 may include other numbers of CPUs. CPUs 122 and 126 may also be referred to as processors or cores. It is noted that processor complex 120 may also include other components not shown in FIG. 1.

The CPUs 122 and 126 may include circuitry to execute instructions defined in an instruction set architecture. Specifically, one or more programs comprising the instructions may be executed by CPUs 122 and 126. Any instruction set architecture may be implemented in various embodiments. For example, in one embodiment, the ARM' instruction set architecture (ISA) may be implemented. Other ISA's may include the PowerPC™ instruction set, the MIPS™ instruction set, the SPARC™ instruction set, the x86 instruction set (also referred to as IA-32), the IA-64 instruction set, etc. Other types of ISA's may also be utilized, including custom-designed or proprietary ISA's.

CPU 122 may include level one (L1) cache 124 and CPU 126 may include L1 cache 128, and L1 caches 124 and 128 may be coupled to L2 cache 130. Other embodiments may include additional levels of cache (e.g., level three (L3) cache). L1 caches 124 and 128 and L2 cache 130 may comprise any capacity and configuration (e.g. direct mapped, set associative). L2 cache 130 may be coupled to memory controller 134 via BIU 132, coherence point 112, and switch fabric 115. BIU 132 may include various logic structures to couple CPUs 122 and 126 and L2 cache 130 to various other devices and blocks.

Coherence point 112 may be configured to act as a gateway between the coherent and non-coherent domains in IC 100. Coherence point 112 may be the location in IC 100 where memory operations become globally visible. Coherence point 112 may also include L2 duplicate tags 114, which are tags from L2 cache 130 and which may be snooped by coherence point 112 for coherency operations. Coherence point 112 may be coupled to switch fabric 115, and coherence point 112 may be coupled to devices 116 and 118 via switch fabric 115. Devices 116 and 118 are representative of any number and type of devices within IC 100. In another embodiment, coherence point 112 and switch fabric 115 may be integrated within a single coherence controller. Coherence point 112 may also include additional logic (e.g., coherence control unit, memory interface unit, coherent transaction table) not shown in FIG. 1. For example, in various embodiments, coherence point 112 may include cache coherency logic employing a cache coherency protocol to ensure data accessed by each agent is kept up to date.

The cache coherency protocol ensures that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches.

Devices 116 and 118 may generally be any type of peripheral device or interface, implementing any hardware functionality included in the system other than the CPUs. For example, the devices 116 and 118 may include video peripherals such as cameras, camera interfaces, image processors, video encoders/decoders, scalers, rotators, blenders, graphics processing units (GPUs), display controllers, etc. The devices 116 and 118 may include audio peripherals such as microphones, speakers, interfaces to microphones and speakers, audio processors, digital signal processors, mixers, etc. The devices 116 and 118 may include interface controllers for various interfaces external to IC 100, including interfaces such as Universal Serial Bus (USB), peripheral component interconnect (PCI) including PCI Express (PCIe), serial and parallel ports, etc. The devices 116 and 118 may include networking peripherals such as media access controllers (MACs). It is noted that in some embodiments, one or more of devices 116 and 118 may be external to IC 100.

Device 116 may include cache 117, which may be a private cache for storing data utilized by device 116. Cache 117 is representative of any type and any number of cache levels. For example, in one embodiment, device 116 may include a L1 cache and a L2 cache, and cache 117 is intended to represent any number of levels of caches in device 116. Similarly, device 118 includes cache 119, which is also representative of any type and any number of cache levels. When a first condition is detected, cache 117 may be shared with other agents in IC 100. In one embodiment, the first condition may be a processor core in device 116 operating at less than full capacity. In other embodiments, the first condition may be other types of conditions. Similarly, when a second condition is detected, cache 119 may be shared with other agents in IC 100. Still further, when a third condition is detected, L2 cache 130 may be shared with other agents external to processor complex 120 in IC 100. For example, in one embodiment, device 118 may store data in L2 cache 130 when the third condition is detected.

Memory controller 134 may include any number of memory ports and may include circuitry configured to interface to memory. For example, memory controller 134 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), etc. Memory controller 134 may also be coupled to memory physical interface circuits (PHYs) 136 and 138. Memory PHYs 136 and 138 are representative of any number of memory PHYs which may be coupled to memory controller 134. Memory PHYs 136 and 138 may be configured to interface to memory devices (not shown). Memory PHYs 136 and 138 may handle the low-level physical interface to the memory devices. For example, the memory PHYs 136 and 138 may be responsible for the timing of the signals, for proper clocking to synchronous DRAM memory, etc.

Memory controller 134 may also include memory controller cache 135 for storing data retrieved from or intended for memory. It is noted that memory controller cache 135 may also be referred to as a "system cache" or a "memory cache". Memory controller cache 135 may be configured to process memory requests from multiple requesting agents. An agent may be defined as a device, logic unit, or software process within IC 100 capable of generating memory requests. An agent may be a CPU, GPU, other processing device, or a software thread executing on any processing device. In one embodiment, a given requesting agent (physical or logical) may be identified by a requesting agent identifier (ID). Alternatively, the requesting agent ID may be a thread identifier (TID) assigned to a thread by the operating system (OS) of IC 100. Each request generated by a requesting agent 32A-C may be accompanied by a group ID. The group ID may also be referred to as dataset ID. The group ID may be a separate identifier from the requesting agent ID and the TID, and the group ID may be assigned to a request based on the dataflow to which the request belongs. The OS or a device driver, depending on the embodiment, may assign the group ID. For some types of dataflows, the same group ID may be shared by multiple requesting agent IDs. In one embodiment, requests to page translation tables may be considered part of the same dataflow, and any of these requests, regardless of the requesting agent ID, may be assigned to a common group ID. For other types of dataflows, a group ID may be utilized by only a single requesting agent.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 100 may differ from those shown in FIG. 1. In other words, direct connections between components may be used for components that are not directly connected in FIG. 1, and components with direct connections in FIG. 1 may instead connect via one or more other components.

Figure 2:
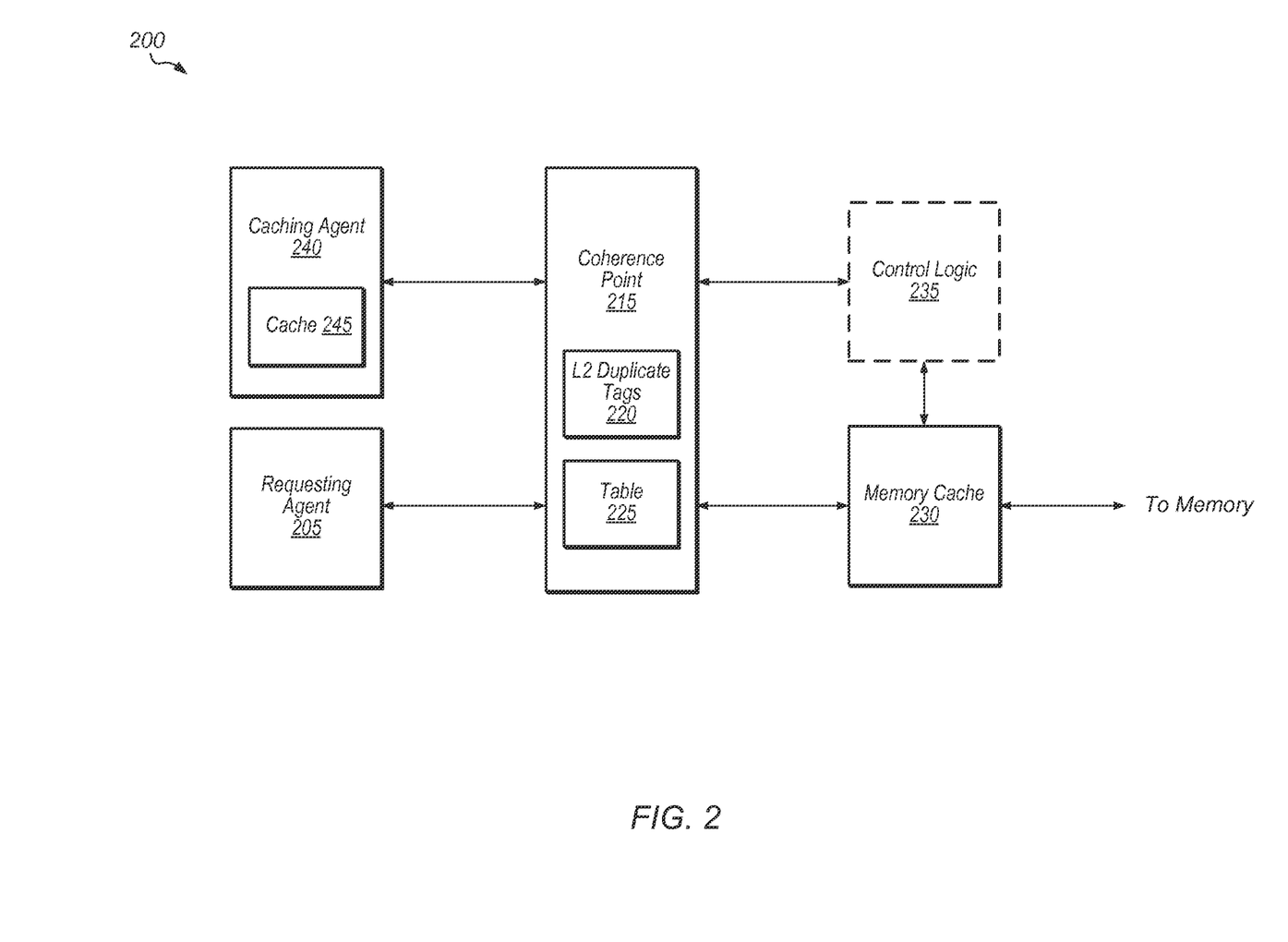
FIG. 2 is a block diagram that illustrates one embodiment of a portion of a SoC.

Turning now to FIG. 2, one embodiment of a portion of a SoC 200 is shown. Requesting agent 205 may be any type of agent, device, or logic unit in SoC 200. For example, in one embodiment, requesting agent 205 may be a GPU. Similarly, caching agent 240 may be any type of agent, device, or logic unit with a local cache in SoC 200. For example, in one embodiment, caching agent 240 may be a processor complex and cache 245 may be a L2 cache. Although not shown in FIG. 2, in some embodiments requesting agent 205 may have one or more local, private caches. Although only a single requesting agent and a single caching agent are shown in SoC 200, this is shown merely for ease of illustration. In some embodiments, SoC 200 may have multiple requesting agents and multiple caching agents.

Requesting agent 205 may generate memory requests and convey the memory requests to coherence point 215. In one embodiment, memory requests may be categorized as coherent memory requests or non-coherent memory requests. A non-coherent memory request is defined as a request for data that is not allocated in any of the requesting agent's caches, and coherence point 215 does not track the state of this data. A coherent memory request is defined as a request for data that can be allocated in the requesting agent's cache and can subsequently be snooped by coherence point 215 to maintain coherency across SoC 200. For the remainder of the discussion regarding FIG. 2, it will be assumed that requesting agent 205 has generated a non-coherent memory request. However, it is to be understood that in other embodiments, the same techniques described herein may be utilized to process coherent memory requests generated by requesting agent 205.

Coherence point 215 may include L2 duplicate tags 220, and in response to receiving a memory request from requesting agent 205, a lookup may be performed for the memory request in L2 duplicate tags 220. In response to detecting that the lookup results in a miss, coherence point 215 may send the memory request to memory cache 230. After receiving the memory request, memory cache 230 may perform a lookup for the memory request.

In response to detecting that the lookup results in a miss, memory cache 230 may send a miss request to memory (not shown). Also in response to detecting a miss, control logic 235 may determine if one or more conditions are met for allocating the memory request in cache 245 of caching agent 240. It is noted that although control logic 235 is shown as being located externally from coherence point 215 and memory cache 230, this is shown merely for ease of illustration. Control logic 235 may be located in a variety of locations depending on the embodiment. For example, in various embodiments, control logic 235 may be located in coherence point 215, in memory cache 230, or external to coherence point 215 and memory cache 230. Also, in some embodiments, control logic 235 may be split into multiple units, and separate portions of control logic 235 may reside in coherence point 215, in memory cache 230, and/or external to both coherence point 215 and memory cache 230.

Control logic 235 may monitor and/or detect the one or more conditions for determining whether to allocate requesting agent 205 memory requests in cache 245 of caching agent 240 on a regular basis, or control logic 235 may monitor the one or more conditions in response to detecting a miss for certain types of memory requests. In one embodiment, control logic 235 may perform these steps for non-coherent memory requests only. In another embodiment, control logic 235 may only perform these steps for memory requests for which requesting agent 205 has specifically requested allocation in cache 245 of caching agent 240. In other embodiments, control logic 235 may perform these steps for other types of memory requests.

The one or more conditions utilized by control logic 235 may vary depending on the embodiment. In one embodiment, a first condition may exist if one or more processor cores of caching agent 240 are shutdown. Alternatively, the first condition may be if the CPU duty cycle of one or more processor cores of caching agent 240 is lower than a given threshold. Still further, the first condition may be if the one or more processor cores of caching agent 240 are only using a small percentage (less than a given threshold) of cache 245. In other embodiments, other types of conditions may be utilized. In addition, two or more separate conditions may be required for triggering the allocation of a memory request (generated by requesting agent 205) in cache 245 of caching agent 240.

If the required conditions have been detected for a received memory request, control logic 235 may cause an allocate command to be sent to coherence point 215 and cache 245 of caching agent 240 indicating the memory request should be allocated in cache 245 of caching agent 240. In response to receiving this allocate command, coherence point 215 may create an entry corresponding to the memory request in table 225. In response to caching agent 240 receiving the allocate command, a cache line may be allocated in cache 245 for the memory request and then caching agent 240 may send an acknowledgment to coherence point 215.

For a read request, when the fill data corresponding to the read request is returned from memory, the data may traverse memory cache 230 and coherence point 215 before arriving at cache 245 of caching agent 240. When the fill data passes through coherence point 215, coherence point 215 may retire the entry corresponding to the memory request in table 225.

Figure 3:
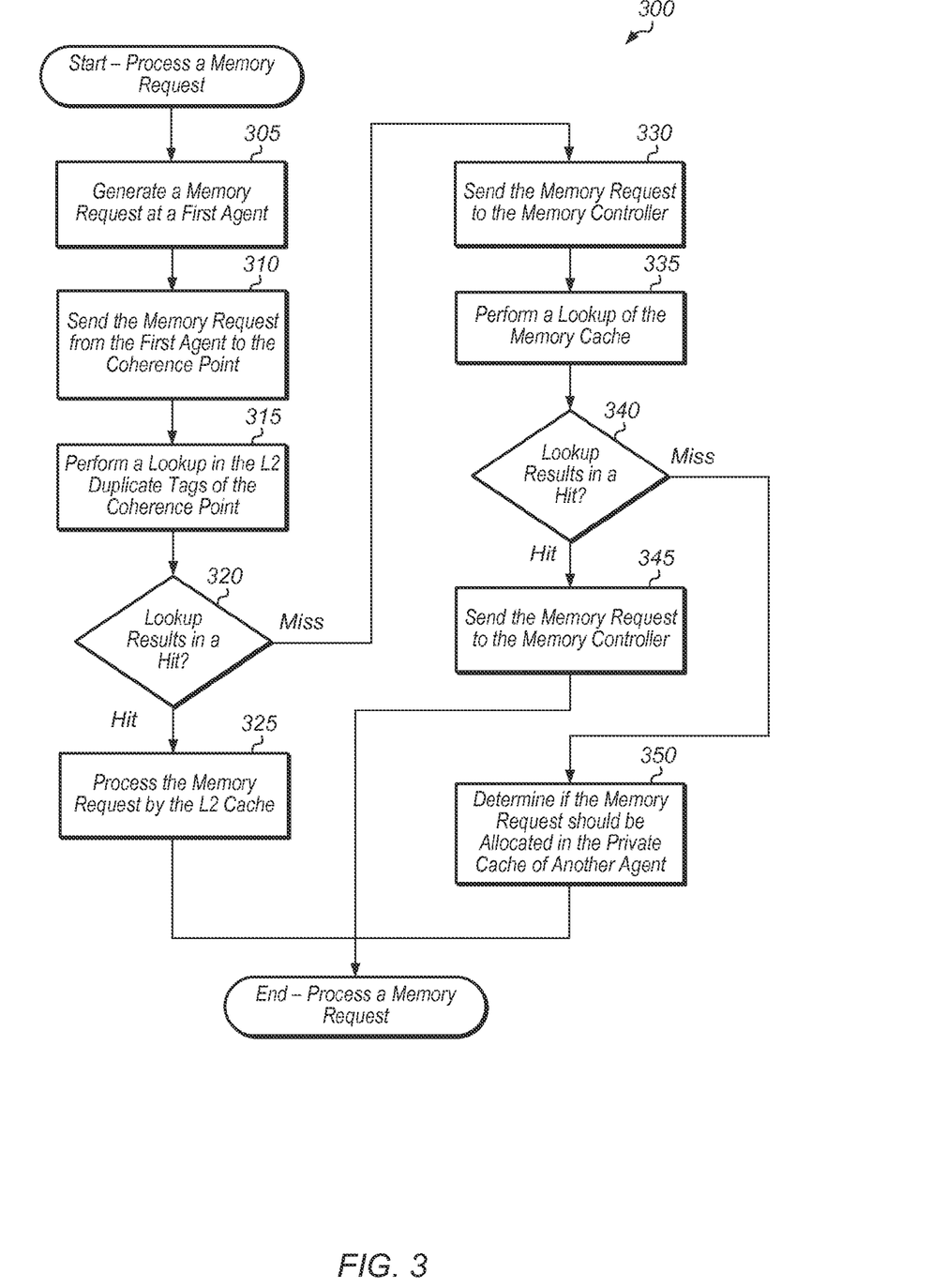
FIG. 3 is a generalized flow diagram illustrating one embodiment of a method for processing a memory request in a SoC.

Turning now to FIG. 3, one embodiment of a method 300 for processing a memory request in a SoC is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A memory request may be generated by a first agent (block 305). The memory request may be a read or write request. In one embodiment, the memory request may be a non-coherent memory request. In other embodiments, the memory request may be any of various other types of requests. Next, the memory request may be sent from the first agent to the coherence point (block 310). A lookup may be performed in the L2 duplicate tags of the coherence point for the memory request (block 315). If the L2 duplicate tags lookup results in a hit (conditional block 320, "hit" leg), then the memory request may be processed by the L2 cache (block 325). If the L2 duplicate tags lookup results in a miss (conditional block 320, "miss" leg), then the memory request may be sent to the memory controller (block 330). At the memory controller, a lookup of the memory cache may be performed for the non-coherent read request (block 335). If the memory cache lookup results in a hit (conditional block 340, "hit" leg), then the memory request may be processed by the memory cache (block 345). If the memory cache lookup results in a miss (conditional block 340, "miss" leg), then the control logic may determine if the non-coherent read request should be allocated in a private cache of another agent (block 350). In one embodiment, the other agent may be the processor complex and the private cache may be the L2 cache of the processor complex. In another embodiment, the private cache may be other private caches located elsewhere in the SoC. The actual process to determine if the non-coherent read request should be allocated in a private cache of another agent may vary according to the embodiment. One such determination process is described below in method 400 of FIG. 4.

Figure 4:
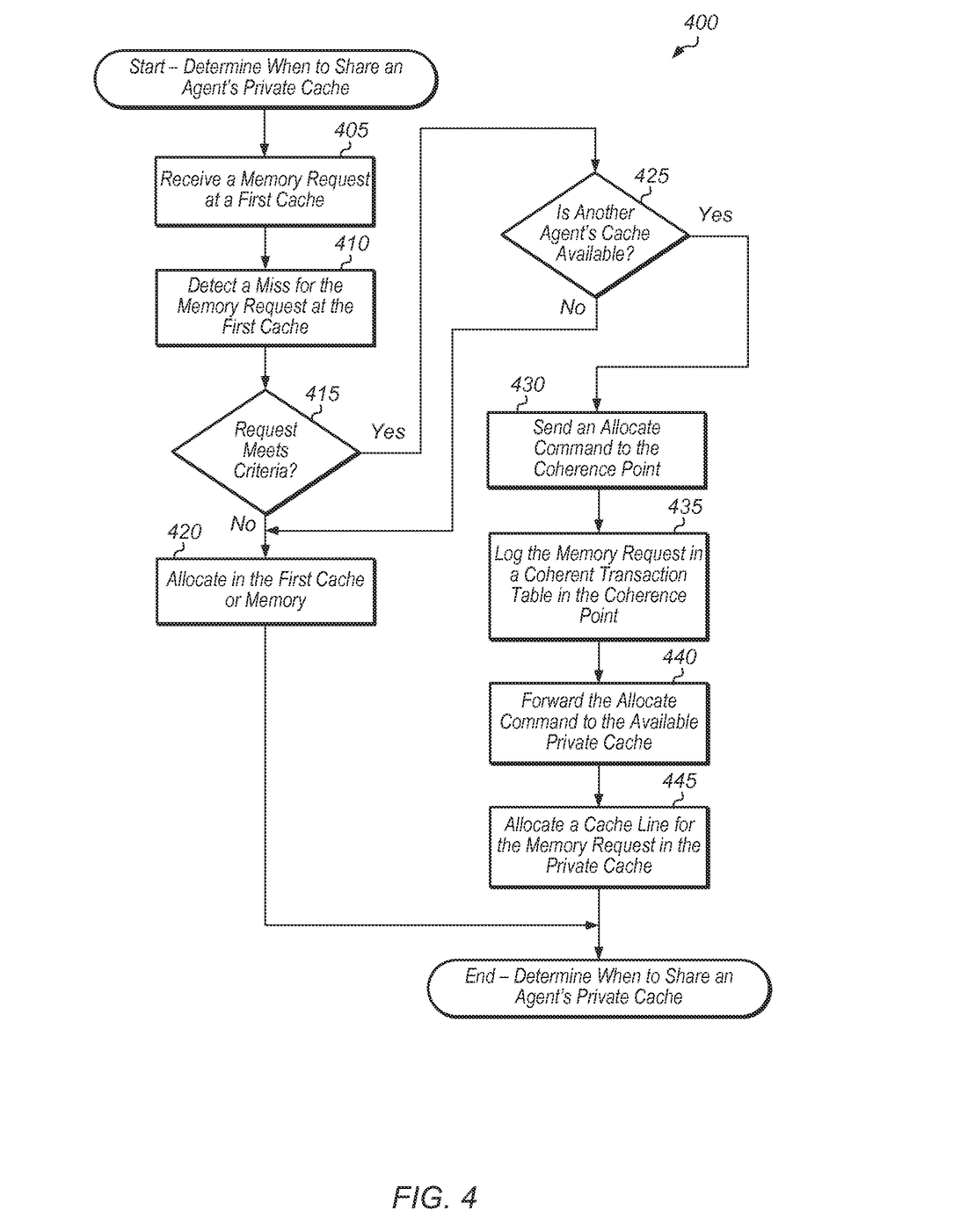
FIG. 4 is a generalized flow diagram illustrating one embodiment of a method for determining when to share an agent's private cache.

Turning now to FIG. 4, one embodiment of a method 400 for determining when to share an agent's private cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A memory request may be received at a first cache (block 405). A lookup may be performed for the memory request, and a miss may be detected for the memory request in the lookup of the first cache (block 410). For the purposes of this discussion, it may be assumed that the memory request was generated by a first agent, and that the first cache is located external to the first agent. In some cases, the memory request may have already missed in a lookup of one or more private caches local to the first agent. For example, in one embodiment, the first agent may be a processor core, and the processor core may check the memory request in a L1 and L2 cache before sending the memory request to the first cache. In other embodiments, the first agent may be other types of processors or logic units. The first cache may have any configuration (e.g., direct mapped, set associative, fully associative) depending on the embodiment. Also, in some embodiments, the memory request may have passed through a switch fabric and a coherence point after being generated by the first agent and before arriving at the first cache. The first agent may also be referred to as the requesting agent in this example. In one embodiment, the first cache may be a memory controller cache. In other embodiments, the first cache may be any of various other types of caches. The memory request may be a write or read request, depending on the scenario.

In response to detecting the miss of the memory request at the first cache, control logic may determine if the memory request meets the criteria for being allocated in another agent's private cache (conditional block 415). In one embodiment, the memory request may qualify if it is a non-coherent memory request. In another embodiment, the memory request may qualify if the first agent has requested that the request be allocated to another agent's private cache. In other embodiments, the memory request may qualify if it meets other requirements.

If the memory request does not meet the criteria (conditional block 415, "no" leg), then the control logic may use any suitable technique for determining whether to allocate the memory request in the first cache or send the memory request to memory (block 420). If the memory request meets the criteria (conditional block 415, "yes" leg), then the control logic may determine if another agent's cache is available for allocating the memory request (conditional block 425). In one embodiment, there may be multiple private caches of other agents, and there may be a priority ranking of each private cache such that if two or more private caches are available for allocating the memory request, the private cache with the higher priority ranking may be utilized. In another embodiment, there may only be a single private cache in the SoC which is eligible for allocating other agent's memory requests. In one embodiment, the control logic may monitor the availability of eligible private caches on a continuous basis as circumstances change regarding the private agents and private caches and by checking various status indicators of the SoC. In another embodiment, the control logic may wait until a qualifying memory request is received at the first cache before determining whether or not any eligible private caches are available.

If another agent's cache is available for allocating the memory request (conditional block 425, "yes" leg), then the first cache may send an allocate command to the coherence point for the memory request (block 430). If another agent's cache is not available for allocating the memory request (conditional block 425, "no" leg), then the control logic may use any suitable technique for determining whether to allocate the memory request in the first cache or send the memory request to memory (block 420). In response to receiving the allocate command, the coherence point may log the memory request in a coherent transaction table (block 435). Also, the coherence point may forward the allocate command to the available private cache of the other agent (block 440). In response to receiving the allocate command, the available private cache may allocate a cache line for the memory request (445). After block 445, method 400 may end. If the memory request is a read request, then when the fill data comes back from memory, the coherence point may retire the corresponding entry in the coherent transaction table and the available private cache may write the data to the allocated cache line and update the corresponding tag.

Figure 5:
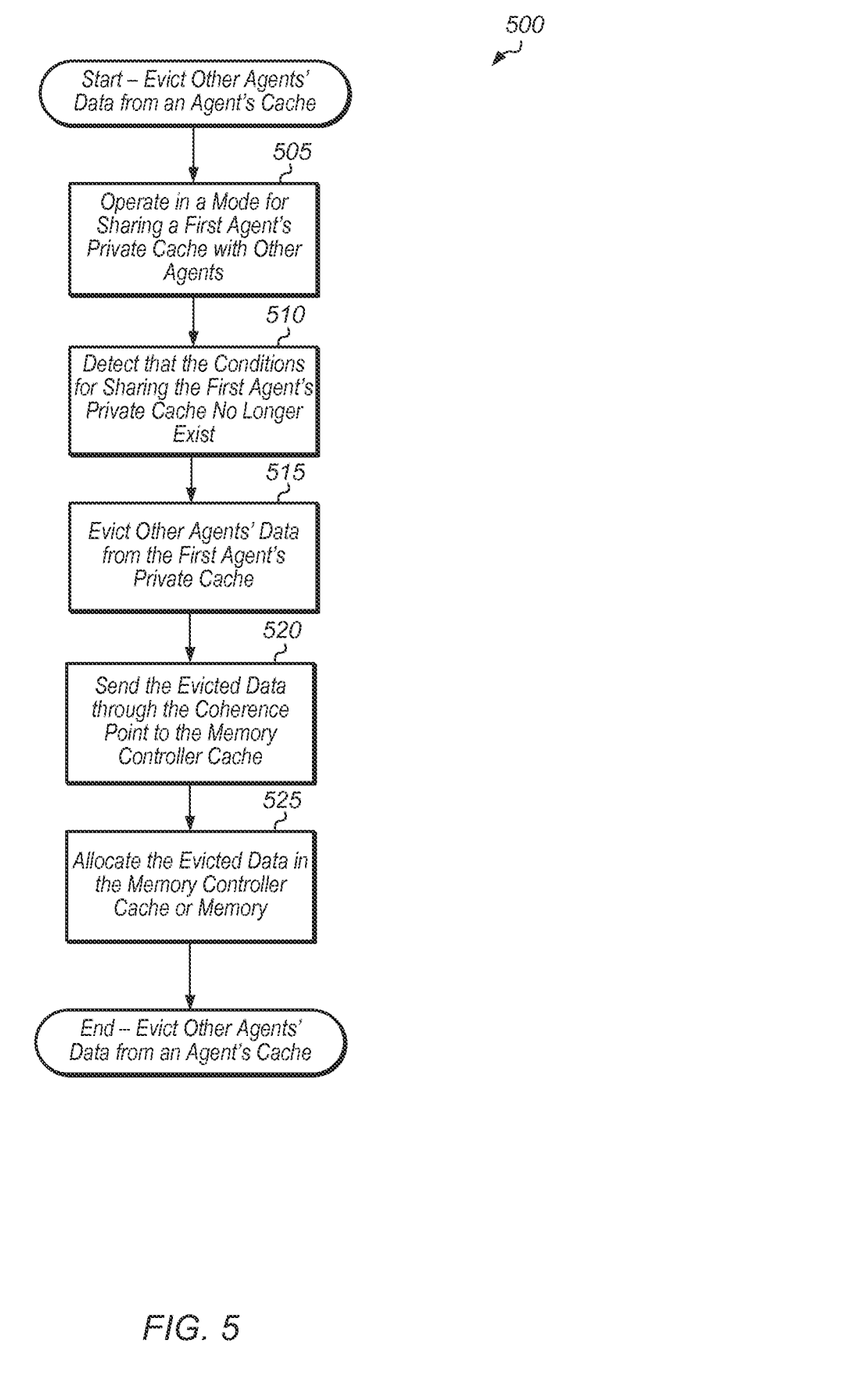
FIG. 5 is a generalized flow diagram illustrating one embodiment of a method for evicting other agents' data from an agent's private cache.

Referring now to FIG. 5, one embodiment of a method 500 for evicting other agents' data from an agent's private cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A first agent may be operating in a mode in which its private cache is shared with other agents (block 505). The mode in which the first agent's private cache is shared with other agents may vary depending on the embodiment. For example, if the first agent is operating at less than full capacity, then the agent's private cache may be shared with other agents. In one embodiment, the first agent may be operating at less than full capacity if one or more processor cores of the first agent are shutdown. Alternatively, the duty cycle of one or more processor cores of the first agent may be below a threshold. In another embodiment, portions of the circuitry of the first agent may be power-gated. In a further embodiment, the first agent may be using less than a given amount of its private cache, wherein the given amount is determined by a programmable threshold.

In a still further embodiment, the first agent's private cache may be shared with other agents when an idle screen use case for the SoC is detected. In this case, the first agent may be the processor complex and the private cache may be the L2 cache. For example, the SoC may be coupled to a display, and the SoC may generate the images and video that are shown on the display. The SoC may store the pixel data that makes up the video and images in a frame buffer, and the frame buffer may be stored in the memory device. The pixel data stored in the frame buffer may be used to drive the display at a fixed frame rate. When the SoC operating system (OS) detects that the frame buffer has not changed for a predetermined period of time, the frame buffer may be stored in the memory cache and in the L2 cache. Depending on the size of the frame buffer and the size of the memory cache and L2 cache, a portion of the frame buffer or the entire frame buffer may be stored in the memory cache and L2 cache. Therefore, for as long as the content shown on the display is not changing, the frame buffer (or a portion thereof) may reside in the memory cache and L2 cache and may be loaded from the memory cache and L2 cache to be shown on the display.

After block 505, control logic may detect that the conditions for sharing the first agent's private cache no longer exist (block 510). For example, in one embodiment, the OS may detect that the frame buffer has changed. In another embodiment, one or more of the first agent's processor cores may have been turned back on. In other embodiments, other conditions may be detected for terminating the sharing of the first agent's private cache. Responsive to detecting that the conditions for sharing the first agent's private cache no longer exist, the first agent may evict all other agents' data from its cache (block 515). In one embodiment, the control logic may notify the first agent that its private cache has been shared with other agents and that the first agent may evict their data from its private cache. In another embodiment, the first agent may automatically clear out its cache of other agent's data as part of a wake-up process. In various embodiments, the cache tags may include an agent ID field, and the first agent may identify data to evict based on the agent ID field of the cache tags. In another embodiment, the first agent may identify external agent data by a dataset ID field stored in the cache tags. In other embodiments, the first agent may utilize other techniques for identifying data stored by other agent's in the first agent's private cache.

Next, the evicted data may be sent through the coherence point to the memory controller cache (block 520). Then, the memory controller cache may use any suitable technique for determining whether to allocate the evicted data in the memory controller cache or send the data to memory (block 525). After block 525, method 500 may end.

Figure 6:
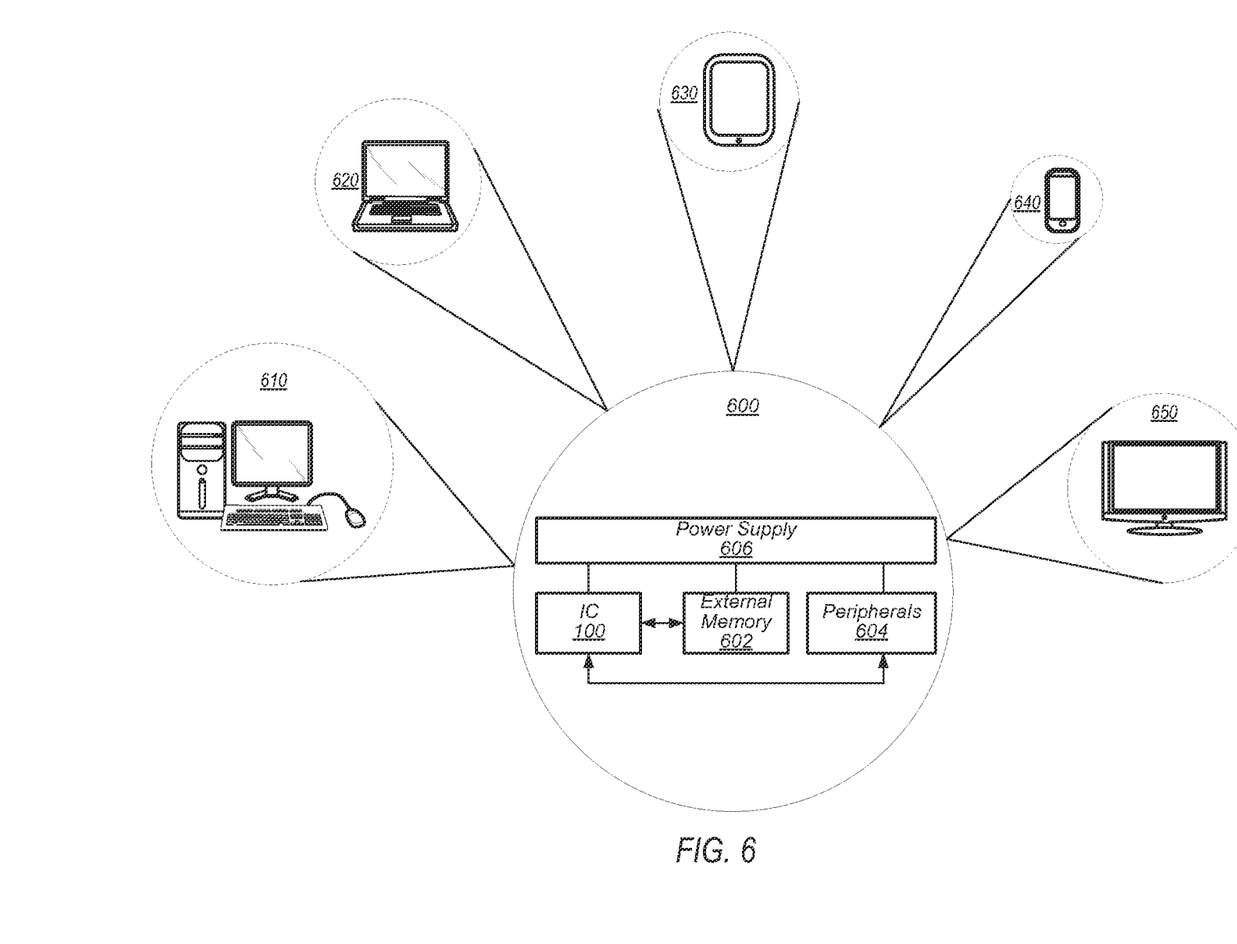
FIG. 6 is a block diagram of one embodiment of a system.

Turning next to FIG. 6, a block diagram of one embodiment of a system 600 is shown. As shown, system 600 may represent chip, circuitry, components, etc., of a desktop computer 610, laptop computer 620, tablet computer 630, cell phone 640, television 650 (or set top box configured to be coupled to a television), or otherwise. In the illustrated embodiment, the system 600 includes at least one instance of IC 100 (of FIG. 1) coupled to an external memory 602. In other embodiments, system 600 may include SoC 200 (of FIG. 2) in place of IC 100.

IC 100 is coupled to one or more peripherals 604 and the external memory 602. A power supply 606 is also provided which supplies the supply voltages to IC 100 as well as one or more supply voltages to the memory 602 and/or the peripherals 604. In various embodiments, power supply 606 may represent a battery (e.g., a rechargeable battery in a smart phone, laptop or tablet computer). In some embodiments, more than one instance of IC 100 may be included (and more than one external memory 602 may be included as well).

The memory 602 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 100 in a chip-on-chip configuration, a package-on-package configuration, or a multichip module configuration.

The peripherals 604 may include any desired circuitry, depending on the type of system 600. For example, in one embodiment, peripherals 604 may include devices for various types of wireless communication, such as wifi, Bluetooth, cellular, global positioning system, etc. The peripherals 604 may also include additional storage, including RAM storage, solid state storage, or disk storage. The peripherals 604 may include user interface devices such as a display screen, including touch display screens or multitouch display screens, keyboard or other input devices, microphones, speakers, etc.

Figure 7:
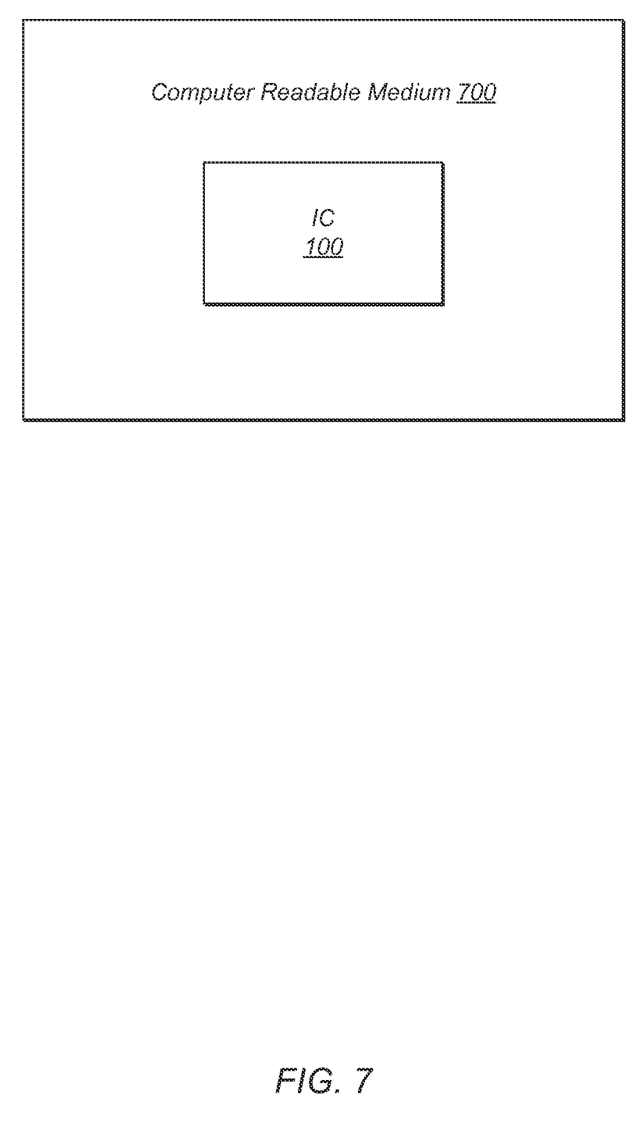
FIG. 7 is a block diagram of one embodiment of a computer readable medium.

Referring now to FIG. 7, one embodiment of a block diagram of a computer readable medium 700 including one or more data structures representative of the circuitry included in IC 100 (of FIG. 1) is shown. Alternatively, computer readable medium 700 may include one or more data structures representative of the circuitry included in SoC 200 (of FIG. 2). Generally speaking, computer readable medium 700 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 700 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 700 may be the netlist(s) (with or without the synthesis library) or the data set(s), as desired. In yet another alternative, the data structures may comprise the output of a schematic program, or netlist(s) or data set(s) derived therefrom.

While computer readable medium 700 includes a representation of IC 100, other embodiments may include a representation of any portion or combination of portions of IC 100 and/or SoC 200 (e.g., coherence point, memory controller cache, control logic).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a first agent comprising a first cache;
   a second agent comprising a second cache;
   a third cache, wherein memory requests which miss in the first cache are sent to the third cache, and wherein memory requests which miss in the second cache are sent to the third cache; and
   control logic;
   wherein responsive to detecting a miss of a first memory request in the third cache, wherein the first memory request is generated by the first agent, the control logic is configured to:
      detect a first condition; and
      responsive to detecting the first condition, allocate the first memory request in the second cache.

2. The system as recited in claim 1, wherein the first memory request is a non-coherent memory request.

3. The system as recited in claim 1, wherein the second agent comprises a processor core, and wherein the first condition is detecting that the processor core is operating at less than full capacity.

4. The system as recited in claim 1, wherein responsive to detecting that the first condition is no longer present, the second cache is configured to evict data corresponding to the first memory request from the second cache to the third cache.

5. The system as recited in claim 1, further comprising a coherence point, wherein the coherence point comprises duplicate tags of the second cache, and wherein the coherence point is configured to:
   receive the first memory request from the first cache;
   convey the first memory request from the first agent to the third cache responsive to detecting a miss for the first memory request in the duplicate tags of the second cache.

6. The system as recited in claim 5, wherein responsive to detecting the first condition, control logic is further configured to send an allocate command for the first memory request to the coherence point.

7. The system as recited in claim 6, wherein the coherence point is configured to create an entry in a table for the first memory request and forward the allocate command to the second cache responsive to receiving the allocate command.

8. An apparatus comprising:
   a cache hierarchy, wherein the cache hierarchy comprises a level one (L1) cache, a level two (L2) cache, and a memory controller cache; and
   a first device, wherein the first device is coupled to a memory via the memory controller cache;
   wherein the memory controller cache is configured to:
      receive a first memory request from the first device;
      responsive to detecting a miss for the first memory request and determining the first memory request qualifies to be sent to the L2 cache, send an allocate command to the L2 cache for the first memory request.

9. The apparatus as recited in claim 8, wherein the memory controller cache is further configured to:
   receive a second memory request from the L2 cache; and
   allocate a cache line for the second memory request responsive to detecting a miss for the second memory request.

10. The apparatus as recited in claim 8, wherein the memory controller cache is lower in the cache hierarchy than the L2 cache.

11. The apparatus as recited in claim 8, further comprising a processor complex with one or more processor cores, wherein the L2 cache is located in the processor complex, and wherein the memory controller cache is configured to send an allocate command to the L2 cache for the first memory request responsive to determining the one or more processor cores are shutdown.

12. The apparatus as recited in claim 8, wherein the first memory request qualifies to be sent to the L2 cache if the first memory request is a non-coherent memory request.

13. The apparatus as recited in claim 8, wherein the first device is a graphics processing unit (GPU).

14. The apparatus as recited in claim 13, wherein the first memory request qualifies to be sent to the L2 cache if the GPU requests for the first memory request to be allocated in the L2 cache.

15. A method comprising:
    receiving a first memory request at a first cache of a multi-level cache hierarchy, wherein a first agent is a source of the first memory request;
    detecting a miss for the first memory request in the first cache; and
    sending an allocate command to a coherence point responsive to determining a second cache is available for caching the first memory request, wherein the second cache is a private cache of a second agent;
    creating an entry corresponding to the first memory request in a table in the coherence point responsive to receiving the allocate command at the coherence point;
    forwarding the allocate command to the second cache; and
    allocating a cache line for the first memory request in the second cache responsive to receiving the allocate command at the second cache.

16. The method as recited in claim 15, wherein the second agent is a processor core, and wherein the second cache is a level two (L2) cache.

17. The method as recited in claim 15, wherein the first memory request includes an attribute indicating that the first agent is requesting for the first memory request to be allocated in the second cache.

18. The method as recited in claim 15, further comprising:
    receiving a second memory request at the coherence point, wherein the second memory request is generated by the second agent;
    forwarding the second memory request to the first cache, wherein the first cache is a memory controller cache; and
    allocating a cache line for the second memory request in the memory controller cache responsive to detecting a miss for the second memory request in the memory controller cache.

19. The method as recited in claim 18, further comprising forwarding a miss request to memory responsive to detecting a miss for the second memory request in the memory controller cache.

20. The method as recited in claim 15, wherein the second cache is higher in the multi-level cache hierarchy than the first cache.

* * * * *